(12) United States Patent
Ogaki et al.

(10) Patent No.: US 12,311,803 B2
(45) Date of Patent: May 27, 2025

(54) CHARGING CONTROL SYSTEM

(71) Applicant: HONDA MOTOR CO., LTD., Tokyo (JP)

(72) Inventors: Toru Ogaki, Tokyo (JP); Syuhei Kouchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 18/103,078

(22) Filed: Jan. 30, 2023

(65) Prior Publication Data

US 2023/0256864 A1 Aug. 17, 2023

(30) Foreign Application Priority Data

Feb. 16, 2022 (JP) .................. 2022-022108

(51) Int. Cl.
*B60L 58/26* (2019.01)
*B60H 1/00* (2006.01)
(Continued)

(52) U.S. Cl.
CPC .......... *B60L 58/26* (2019.02); *B60H 1/00735* (2013.01); *B60H 1/00964* (2013.01); *H01M 10/425* (2013.01); *H01M 10/44* (2013.01); *H01M 10/613* (2015.04); *H01M 10/625* (2015.04); *H01M 10/63* (2015.04);
(Continued)

(58) Field of Classification Search
CPC ........ B60L 58/26; B60L 53/14; H01M 10/63; H01M 10/613; H01M 10/625; H02J 7/04; H02J 7/00; H02J 7/34; H02J 3/32
See application file for complete search history.

(56) References Cited

U.S. PATENT DOCUMENTS

2003/0118891 A1* 6/2003 Saito .................. B60L 3/0046
429/62
2020/0243924 A1* 7/2020 Kinoshita ............. H01M 10/63

FOREIGN PATENT DOCUMENTS

JP 2020-089021 A 6/2020
JP 2020089021 * 6/2020 .............. B60L 50/40
(Continued)

OTHER PUBLICATIONS

Jun. 6, 2023, Translation of Japanese Office Action issued for related JP Application No. 2022-022108.

*Primary Examiner* — Tan Q Nguyen
(74) *Attorney, Agent, or Firm* — Paratus Law Group, PLLC

(57) ABSTRACT

A charging control system includes: a battery rechargeable with electric power from an external power supply; a battery cooler that cools the battery; and a controller that controls charging of the battery and cooling of the battery. The controller includes processing circuitry configured to: acquire, in a case where charging is included in a scheduled travel plan, noise information related to a charging system that performs the charging and environment information of a charging place where the charging is performed; determine a quietness requirement of the charging place based on the noise information and the environment information; determine a target temperature of the battery at the time of arrival at the charging place or at the time of start of the charging based on the quietness requirement; and control the battery cooler based on the target temperature of the battery.

7 Claims, 8 Drawing Sheets

(51) Int. Cl.
*H01M 10/42* (2006.01)
*H01M 10/44* (2006.01)
*H01M 10/613* (2014.01)
*H01M 10/625* (2014.01)
*H01M 10/63* (2014.01)
*H01M 10/663* (2014.01)
*H02J 7/00* (2006.01)

(52) U.S. Cl.
CPC ......... *H01M 10/663* (2015.04); *H02J 7/0047* (2013.01); *H02J 7/0071* (2020.01); *B60H 1/00278* (2013.01); *B60L 2240/545* (2013.01); *H01M 2220/20* (2013.01)

(56) References Cited

FOREIGN PATENT DOCUMENTS

| | | |
|---|---|---|
| JP | 2020-124012 A | 8/2020 |
| JP | 2020-195204 A | 12/2020 |

\* cited by examiner

FIG. 6

| QUIETNESS REQUIREMENT | UPPER LIMIT ROTATION SPEED OF COMPRESSOR | MAXIMUM DUTY OF PUMP |
|---|---|---|
| HIGH | R1 rpm | D1 % |
| MEDIUM | R2 rpm | D2 % |
| LOW | R3 rpm | D3 % |

$R3 > R2 > R1$、 $D3 \geq D2 > D1$

CHARGING CONTROL SYSTEM

CROSS REFERENCE TO RELATED APPLICATIONS

This application claims priority to Japanese Patent Application No. 2022-022108 filed on Feb. 16, 2022, the contents of which are incorporated herein by reference.

TECHNICAL FIELD

The present invention relates to a charging control system mounted on a vehicle.

BACKGROUND ART

In recent years, as a specific measure against climate change of the earth, efforts to realize a low-carbon society or a decarbonized society have been actively made. In vehicles, a reduction in $CO_2$ emission and an improvement in energy efficiency are strongly required, and a driving source is rapidly electrified. Specifically, a vehicle such as an electrical vehicle or a hybrid electrical vehicle has been developed which includes an electric motor as the driving source of the vehicle, and a battery as a secondary battery capable of supplying electric power to the electric motor.

In such a vehicle, normal charging in which a battery is charged by being connected to an external power supply or rapid charging in which a current larger than that in the normal charging flows through the batters, to charge the battery can be performed. Since the battery generates heat at the time of charging and discharging, it is necessary to appropriately cool the battery. In particular, the battery is likely to generate heat during the rapid charging. When the battery generates heat and reaches a temperature equal to or higher than a predetermined temperature, an output of the battery is restricted from the viewpoint of safety.

By the way, an operation sound is generated from a charging system along with the charging. In addition, an operation sound is also generated from a cooling device when the battery is cooled. When a charging station is on an expressway, there is no particular problem even when the operation sound is large, but when the charging station is in a residential district, it is necessary to consider an influence on the neighborhood.

In 1132020-124012A and JP2020-089021A, a microphone is mounted on a vehicle and a sound around the vehicle is detected to set a noise level.

However, in JP2020-124012A and JP2020-089021A, a microphone is required for a vehicle, and the manufacturing cost increases. In addition, when cooling of the battery during the charging is restricted based on the noise level detected in the charging station; the temperature of the battery becomes higher than an output restriction temperature and an output restriction is performed, and there is a concern that a charging time may be extended.

An object of the present invention is to provide a charging control system capable of preventing an increase in charging time while charging in consideration of the neighborhood is possible.

SUMMARY OF INVENTION

According to an aspect of the present invention, there is provided a charging control system including:
a battery rechargeable with electric power from an external power supply;
a battery cooler that cools the battery; and
a controller that controls charging of the battery and cooling of the battery, in which the control device includes processing circuitry configured to:
acquire, in a case where charging is included in a scheduled travel plan, noise information related to a charging system that performs the charging and environment information of a charging place where the charging is performed;
determine a quietness requirement of the charging place based on the noise information and the environment information;
determine a target temperature of the battery at the time of arrival at the charging place or at the time of start of the charging based on the quietness requirement; and
control the battery cooler based on the target temperature of the battery.

BRIEF DESCRIPTION OF DRAWINGS

FIG. 6 is a diagram illustrating an upper limit rotation speed of an air conditioner 18 (compressor 181) and a maximum duty ratio of a battery cooling circuit 19 (pump EWP) corresponding to the quietness requirement;

DESCRIPTION OF EMBODIMENTS

Hereinafter, an embodiment of a charging control system of the present disclosure will be described with reference to the accompanying drawings.

[Charging Control System]

Figure 1:
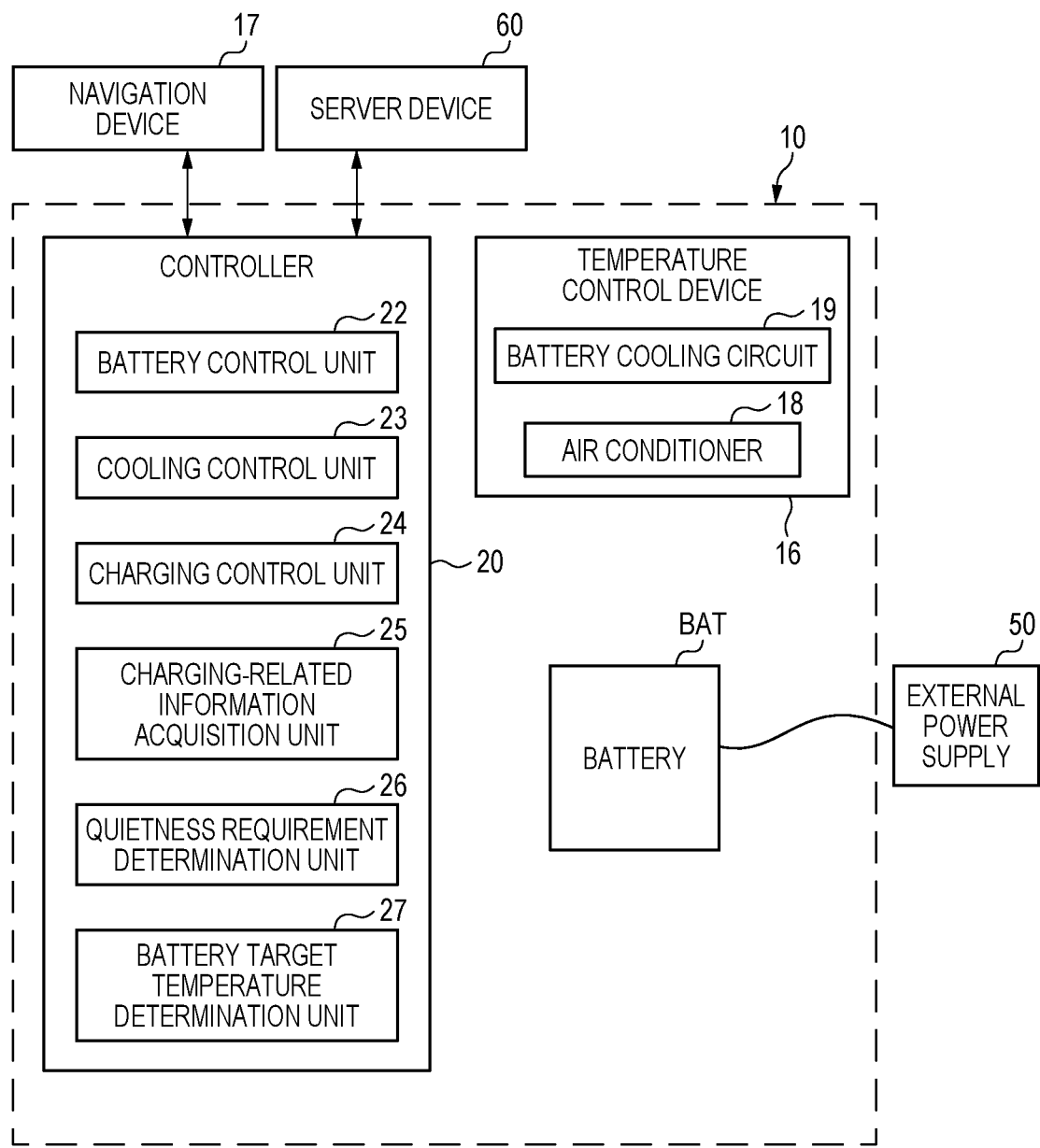
FIG. 1 is a diagram illustrating a configuration of a charging control system 10.

As illustrated in FIG. 1, a charging control system 10 includes a battery BAT, a temperature control device 16, and a controller 20 that controls the battery BAT and the temperature control device 16, and is mounted on a vehicle such as an electrical vehicle.

[Battery]

The battery BAT is, for example, a secondary battery such as a lithium ion battery. The battery BAT is connected to (plugged in) an external power supply 50 outside the vehicle, for example, a rapid charger via a charging plug, and is configured to be charged with introduced electric power. The battery BAT mainly supplies the electric power to a drive motor (not illustrated), In addition, the battery BAT is also configured to be charged with electric power supplied at the time of regeneration of the drive motor.

[Temperature Control Device]

Figure 2:
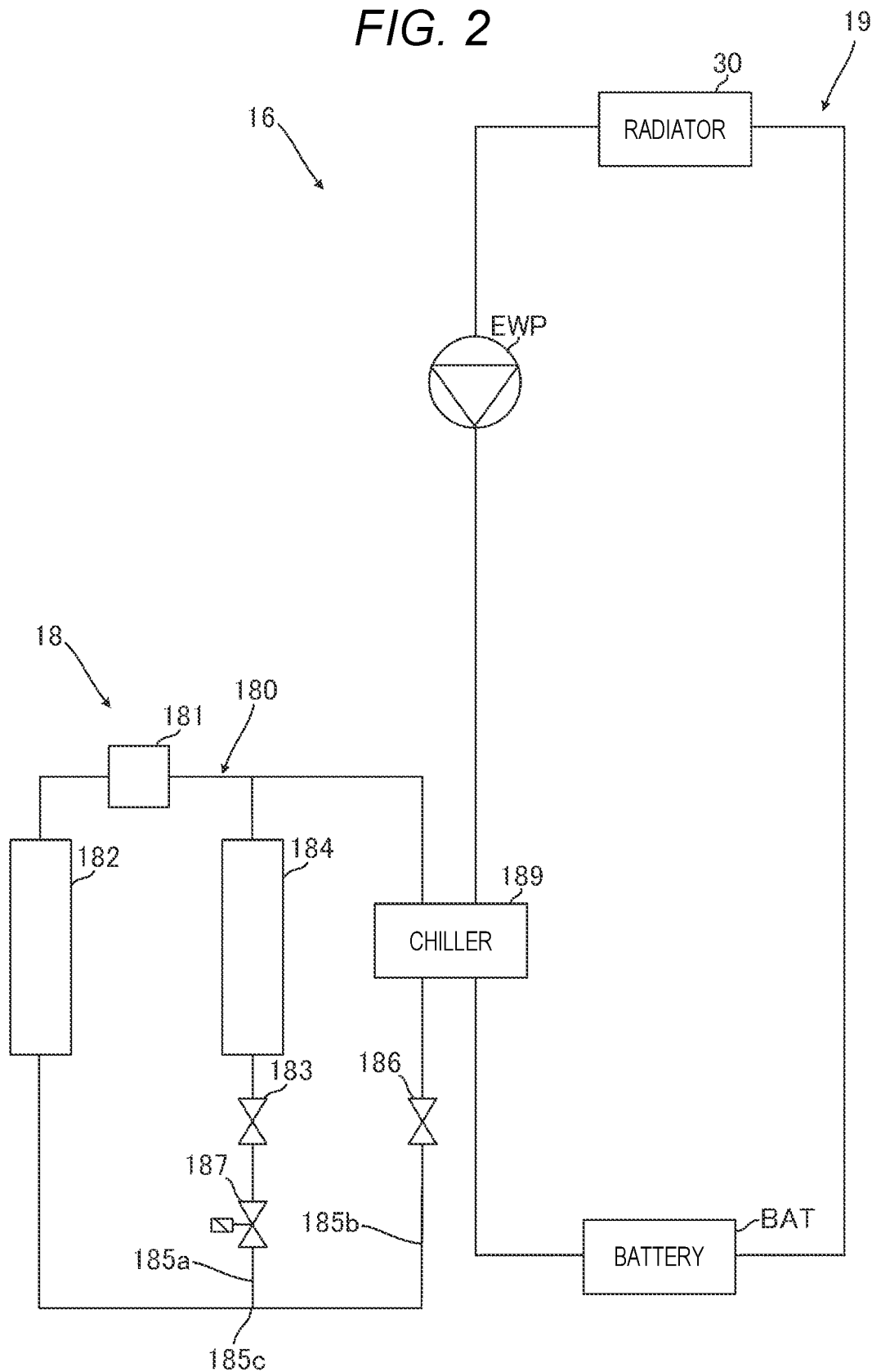
FIG. 2 is a diagram illustrating a configuration of a temperature control device 16.

As illustrated in FIG. 2, the temperature control device 16 includes an air conditioning device (air conditioner) 18 and a battery cooling circuit 19, Hereinafter, the air conditioner 18 is referred to as an air conditioner 18. The air conditioner 18 includes a refrigeration cycle 180, and adjusts environment in a vehicle cabin by adjusting a state of air in the vehicle cabin. The air conditioner 18 is controlled by a cooling control unit 23, which will be described later, that receives an operation of an occupant (hereinafter, also referred to as a user). The battery cooling circuit 19 cools the battery BAT and the like by causing a refrigerant to flow through a refrigerant flow path. A heater may be provided in the battery cooling circuit 19 to heat the battery BAT. An operation of the battery cooling circuit 19 is controlled by the cooling control unit 23 such that the temperature of the battery BAT becomes equal to or lower than a power saving temperature based on a temperature control capability of the battery cooling circuit 19. The power saving temperature is a threshold temperature at which a power saving control (output restriction control) of the battery BAT is performed, and includes threshold temperatures on a high temperature side and a low temperature side, but the power saving temperature of the present disclosure means the threshold temperature on the high temperature side which may be exceeded at the time of rapid charging or the like.

In the temperature control device 16, the refrigeration cycle 180 of the air conditioner 18 and the battery cooling circuit 19 are configured such that refrigerants of both can exchange heat with each other via a chiller 189.

More specifically, with reference to FIG. 2, in the refrigeration cycle 180 of the air conditioner 18, a compressor 181, a condenser 182, an expansion valve 183, and an evaporator 184 are provided in series, and a second flow path 185b in which another expansion valve 186 and the chiller 189 are disposed is provided in parallel with a first flow path 185a in which the expansion valve 183 and the evaporator 184 are disposed. In addition, a shutoff valve 187 is provided between the expansion valve 183 and a branch portion 185c of the first flow path 185a and the second flow path 185b, and the refrigerant flows to both the first flow path 185a and the second flow path 185b by setting the shutoff valve 187 to an ON state, and the refrigerant flows only to the second flow path 185b by selling the shutoff valve 187 to an OFF state.

In the battery cooling circuit 19, a pump EWP for supplying the refrigerant, the chiller 189, the battery BAT, and a radiator 30 are connected in series.

In the chiller 189, heat exchange is performed between the refrigerant in the refrigeration cycle 180 and the refrigerant in the battery cooling circuit 19. Therefore, in the temperature control device 16, a cooling capacity of the refrigeration cycle 180 of the air conditioner 18 is distributed for the air conditioner and for battery cooling. That is, when the air conditioner 18 is not used (air conditioner OFF), the shutoff valve 187 is in the OFF state, and all the cooling capacity of the refrigeration cycle 180 can be used for the battery cooling. On the other hand, when the air conditioner 18 is used (air conditioner ON), the shutoff valve 187 is in the ON state, and the cooling capacity that can be used for the battery cooling among the cooling capacity of the refrigeration cycle 180 is reduced by an amount distributed for the air conditioner. Therefore, among the cooling capacity of the refrigeration cycle 180, the cooling capacity that can be used for the battery cooling depends on ON/OFF of the air conditioner 18.

[Navigation Device]

Figure 3:
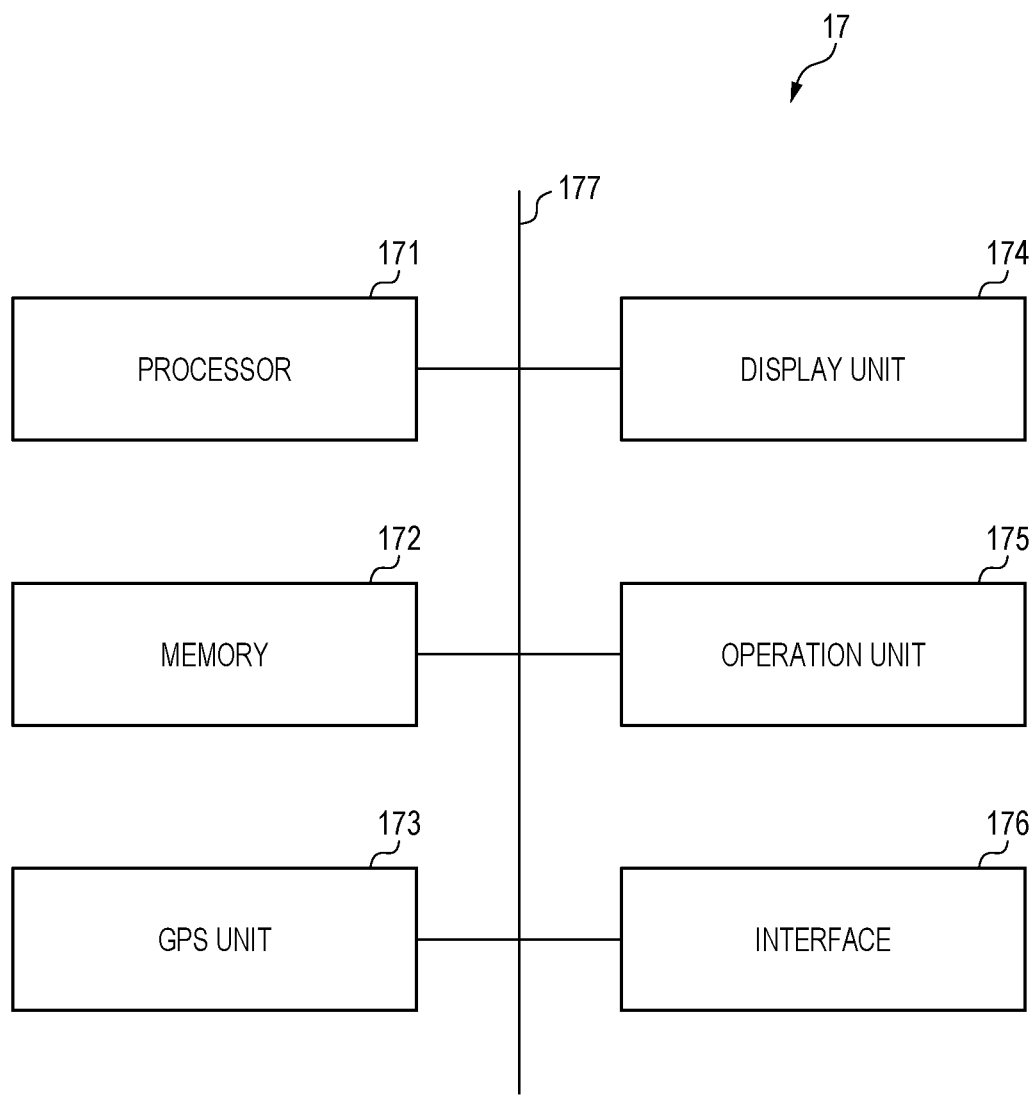
FIG. 3 is a diagram illustrating a configuration of a navigation device 17.

Next, an example of a configuration of the navigation device 17 will be described with reference to FIG. 3. As illustrated in FIG. 3, the navigation device 17 includes a processor 171, a memory 172, a GPS unit 173, a display unit 174, an operation unit 175, and an interface 176. Respective components 171 to 176 are connected to each other via a bus 177.

The processor 171 is, for example, a CPU that controls the entire navigation device 17. The memory 172 includes, for example, a main memory such as a RAM and an auxiliary memory which is a nonvolatile memory such as a flash memory. The main memory is used as a work area of the processor 171. The auxiliary memory stores various programs for operating the navigation device 17. The programs stored in the auxiliary memory are loaded into the main memory and are executed by the processor 171.

In addition, the auxiliary memory of the navigation device 17 also stores map data used for specifying a current position of the vehicle, making a route guidance to a destination, and the like. Although detailed description is omitted, the map data includes road data representing roads on which the vehicle can move, facility data representing information on each facility such as the charging station, and the like.

The GPS unit 173 receives GPS signals (radio waves) from GPS satellites and measures the current position of the vehicle. The current position measured by the GPS unit 173 is used to specify the current position of the vehicle.

The display unit 174 includes a display that displays characters and images, a graphic controller that controls the entire display, and a buffer memory such as a video RAM, (VRAM) that temporarily records image data of an image to be displayed on the display. The display is, for example, a liquid crystal display or an organic EL display.

The operation unit 175 inputs an operation signal corresponding to an operation received from the user to an inside (for example, the processor 171) of the navigation device 17. The operation unit 175 is, for example, a touch panel. In addition, the operation unit 175 may be a remote controller, a keyboard, a mouse, or the like including a plurality of keys.

The interface 176 controls input and output of data between the navigation device 17 and an outside (for example, the controller 20). The interface 176 is controlled by the processor 171. A part or all of the functions of the navigation device 17 may be implemented by, for example, functions of a terminal device such as a smartphone or a tablet terminal possessed by the user of the vehicle.

The navigation device 17 determines, for example, a route from a host vehicle position, which is the current position of the vehicle, to a destination set by the user of the vehicle with reference to the map data or the like. In addition, the navigation device 17 acquires state of charge (SOC) information of the battery BAT from a battery control unit 22, and creates a scheduled travel plan in which charging at a charging station is incorporated into a guidance route when charging is necessary. The scheduled travel plan includes the guidance route, the charging station, each required time, and the like. The navigation device 17 guides the user by displaying the created scheduled travel plan on the display.

[Control Device]

As illustrated in FIG. 1, the controller 20 includes the battery control unit 22, the cooling control unit 23, a charging control unit 24, a charging-related information acquisition unit 25, a quietness requirement determination unit 26, and a battery target temperature determination unit 27. The controller 20 is implemented by an electronic control unit (ECU) including a processor, a memory, an interface, and the like. Incidentally, respective functional units may be configured as separate control devices.

The battery control unit 22 calculates a state of charge (SOC) of the battery BAT based on an output of a battery sensor attached to the battery BAT. The cooling control unit 23 controls the temperature control device 16 to cool the battery BAT, and controls the air conditioner 18 in accordance with a user operation. The charging control unit 24 controls an in-vehicle charger (not illustrated) during normal charging, and controls the charging of the battery BAT by communicating with the external power supply 50 during the rapid charging.

The charging-related information acquisition unit 25 is configured to communicate with the navigation device 17 and a server device 60. The charging-related information acquisition unit 25 acquires the scheduled travel plan and acquires, in a case where charging is included in the scheduled travel plan, noise information related to a charging station CS that performs the charging and environment information of the charging place where the charging is performed. The scheduled travel plan is, for example, a scheduled travel route from a current position of a vehicle to a destination, and is displayed on the display unit 174 of the vehicle when the user registers the destination with the navigation device 17. The scheduled travel plan includes charging by the charging station CS located on a travel route or near the travel route in consideration of the SOC of the battery BAT. The scheduled travel plan may be a plan in which one travel route is displayed, or may be a plan selected by the user from a plurality of travel routes.

Figure 4:
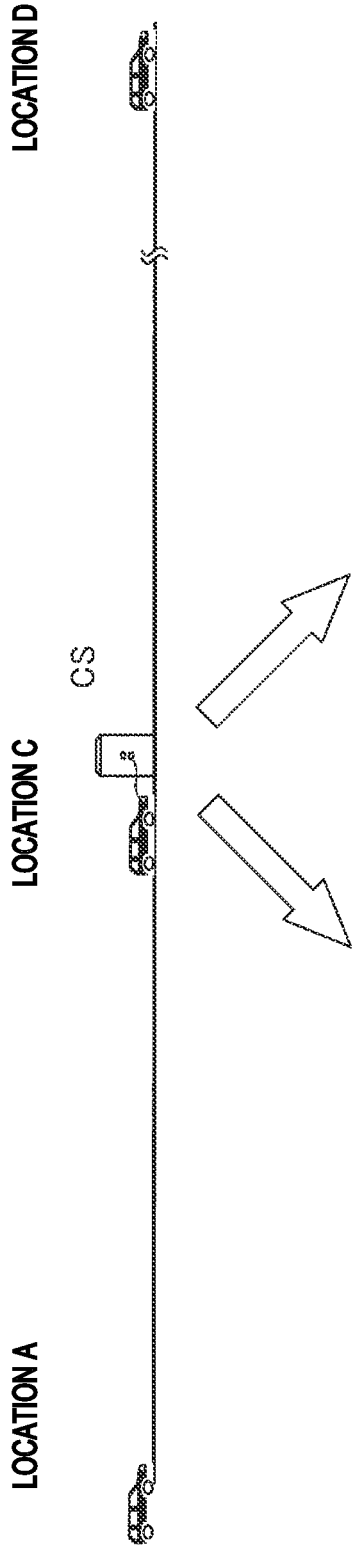
FIG. 4 is a diagram illustrating relations between noise information of a charging station CS and a first quietness requirement, and relations between environment information of a charging place and a second quietness requirement.

For example, as illustrated in FIG. 4, assuming that the current position of the vehicle is a location A and the destination is a location D, the scheduled travel plan includes charging at a charging station CS at a location C between the location A and the location D. Accordingly, the user can drive the vehicle toward the destination (location D) without worrying about the vehicle becoming unable to travel due to lack of power (so-called power shortage), In a case where charging is not necessary before the vehicle arrives the destination, it is needless to say that charging may not be included in the scheduled travel plan.

The noise information related to the charging station CS is information for estimating an operation sound (for example, an operation sound of a charger) generated from the charging station CS along with the charging. The charging-related information acquisition unit 25 acquires, for example, the noise information of the charging station CS included in the scheduled travel plan from among the noise information related to the charging station CS of each place stored in the server device 60.

For example, as illustrated in FIG. 4, the noise information of the charging station CS is classified into four types of "none", "underground buried", "small", and "large". "None" indicates that the noise information cannot be acquired, "underground buried" indicates that the charging system of the charging station CS is buried in the ground and a noise generated at the time of charging is extremely small, "small" indicates that the noise generated at the time of charging is small, and "large" indicates that the noise generated at the time of charging is large.

The environment information of the charging place is information for estimating a surrounding environment of the charging station CS, The charging-related information acquisition unit 25 acquires, for example, the environment information of the charging station CS included in the scheduled travel plan from among the environment information related to the charging station CS of each place stored in the server device 60.

For example, as illustrated in FIG. 4, the environment information of the charging station CS is classified into three types of "expressway", "urban area", and "residential district". "Expressway" indicates that the charging station CS included in the scheduled travel plan is on an expressway with large environmental noise, "urban area" indicates that the charging station CS included in the scheduled travel plan is in an urban area with large environmental noise, and "residential district" indicates that the charging station CS included in the scheduled travel plan is in a residential district with small environmental noise.

The quietness requirement determination unit 26 determines a quietness requirement for a charging place, which is an installation place of the charging station CS, based on the noise information and the environment information of the charging station CS acquired by the charging-related information acquisition unit 25. The quietness requirement determination unit 26 of the present embodiment determines a higher one of a first quietness requirement based on the noise information of the charging station CS and a second quietness requirement based on the environment information of the charging station CS as the quietness requirement. As a result, it is possible to set a quietness requirement that can satisfy both conditions in consideration of the noise information and the environment information of the charging station CS.

For example, as illustrated in FIG. 4, when the noise information of the charging station CS is "none" or "underground buried", the first quietness requirement is set to "high". When the noise information of the charging station CS is "small", the first quietness requirement is set to "medium". When the noise information of the charging station CS is "large", the first quietness requirement is set to "low". That is, the first quietness requirement is set to be lower when the operation sound of the charging station CS is estimated to be large than when the noise is estimated to be small.

In addition, as illustrated in FIG. 4, when the environment information of the charging station CS is "expressway" or "urban area" and a time zone for charging is "daytime", the second quietness requirement is se to "low", and when the environment information of the charging station CS is "expressway" or "urban area" and the time zone for charging is "nighttime to early morning", the second quietness requirement is set to "medium". Further, when the environment information of the charging station CS is "residential district" and the time zone for charging is "daytime", the second quietness requirement is set to "medium", and when the environment information of the charging station CS is "residential district" and the time zone for charging is "nighttime to early morning", the second quietness requirement is set to "high". That is, the second quietness requirement is set in accordance with the classification of the charging place and the time zone in which the charging is performed.

Figure 5:
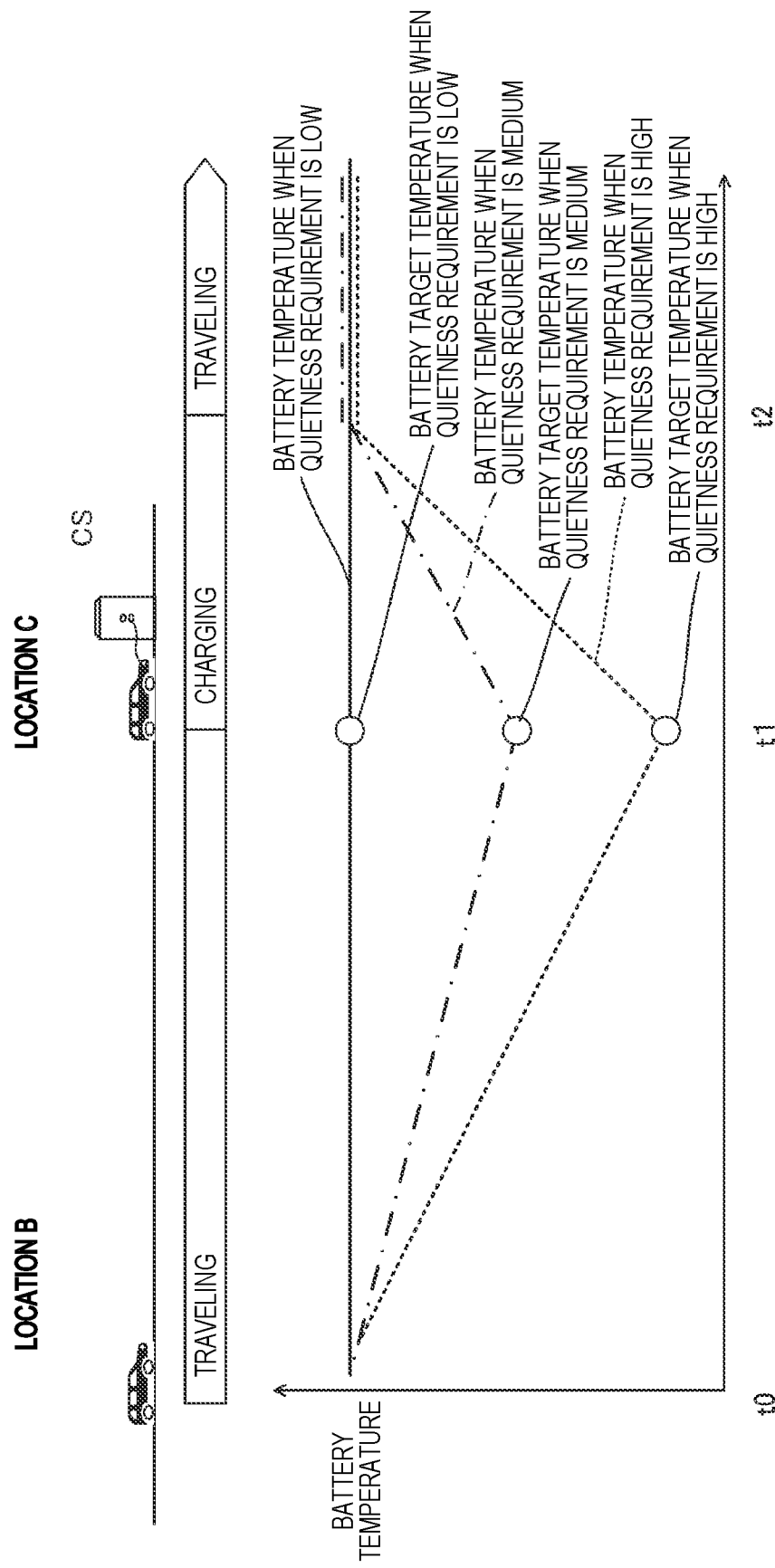
FIG. 5 is a diagram illustrating relations among a quietness requirement, a battery target temperature, and a battery temperature in a scheduled travel plan.

The battery target temperature determination unit 27 determines a target temperature of the battery BAT at the time of arrival at the charging station CS or at the time of start of the charging based on the quietness requirement set by the quietness requirement determination unit 26. For example, as illustrated in FIG. 5, in a case where the quietness requirement is "low", when the battery BAT is charged while cooling the battery BAT so as to satisfy the quietness requirement, there is a low possibility that the temperature of the battery BAT exceeds a predetermined temperature, and thus the target temperature is set to be high. In addition, in a case where the quietness requirement is "medium", when the battery BAT is charged while cooling the battery BAT so as to satisfy the quietness requirement, there is a possibility that the temperature of the battery BAT exceeds the predetermined temperature, and thus the target temperature is set to be lower than that when the quietness requirement is "low". Further, in a case where the quietness requirement is "high", when the battery BAT is charged while cooling the battery BAT so as to satisfy the quietness requirement, there is a high possibility that the temperature of the battery BAT' exceeds the predetermined temperature, and thus the target temperature is set to be further lower than that when the quietness requirement is "medium".

The cooling control unit 23 controls the temperature control device 16 such that the battery BAT at the time of arrival at the charging station CS or at the time of start of the charging reaches the target temperature. For example, as illustrated in FIG. 5, in the scheduled travel plan, when a scheduled travel distance or a scheduled travel time to the charging station CS (location C) reaches a predetermined distance or a predetermined time (location B), the cooling of the battery BAT is started with the target temperature corresponding to the quietness requirement as a target.

In addition, when the charging of the battery BAT' is started at the charging station CS, the cooling control unit 23 continues the cooling of the battery BAT while restricting an operation sound of the temperature control device 16 in accordance with the quietness requirement. For example, as illustrated in FIG. 6, assuming that R3>R2>R1 and D3>D2>D1, when the quietness requirement is "high", an upper limit rotation speed of the compressor 181 of the refrigeration cycle 180 of the air conditioner 18 is set to "R1" rpm, and a duty ratio of the pump EWP of the battery cooling circuit 19 is set to "D1"%. When the quietness requirement is "medium", the upper limit rotation speed of the compressor 181 of the refrigeration cycle 180 of the air conditioner 18 is set to "R2" rpm, and the duty ratio of the pump EWP of the battery cooling circuit 19 is set to "D2"%. When the quietness requirement is "low", the upper limit rotation speed of the compressor 181 of the refrigeration cycle 180 of the air conditioner 18 is set to "R3" rpm, and the duty ratio of the pump EWP of the battery cooling circuit 19 is set to "D3"%.

Incidentally, during the charging at the charging station CS, in a situation where the cooling performance for battery cooling is not sufficient due to the use of the air conditioner 18, the battery temperature becomes equal to or higher than the power saving temperature, a current supplied to the battery BAT is restricted (output restriction), and accordingly, a required charging time may become long. On the other hand, if the battery BAT can be sufficiently cooled by the battery cooling circuit 19 by stopping the air conditioner 18, the output of the battery BAT is not restricted, and the required charging time is shortened.

Figure 7:
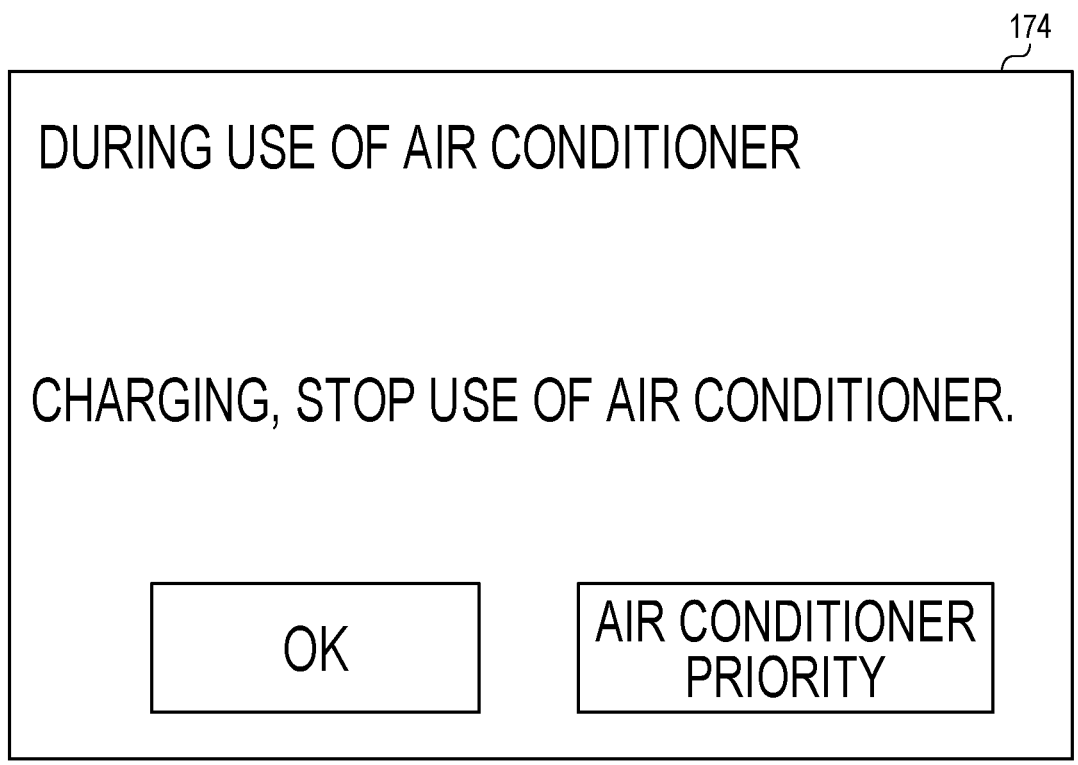
FIG. 7 is a diagram illustrating an example of a proposal of restricting use of an air conditioner, which is displayed on a display unit 174.

Therefore, when the air conditioner 18 is in use during the charging at the charging station CS, the cooling control unit 23 may transmit, to the navigation device 17, a display instruction for displaying a proposal for permission to stop the air conditioner 18. As a result, as illustrated in FIG. 7, a proposal of "Charging, stop use of the air conditioner." is displayed on the display unit 174. In addition, icons of "OK" and "air conditioner priority" are displayed on the display unit 174. When the user selects "OK", the cooling control unit 23 lowers the cooling capacity of the air conditioner 18. In other words, the cooling capacity of the air conditioner 18 is distributed to the battery cooling circuit 19. As a result, the battery BAT can be cooled more appropriately. In addition, since the use of the air conditioner 18 is restricted only when the proposal is approved, it is possible to prevent deterioration in convenience of the occupant staying in the vehicle during the charging.

Next, a processing procedure of the controller 20 will be described with reference to FIG. 8.

Figure 8:
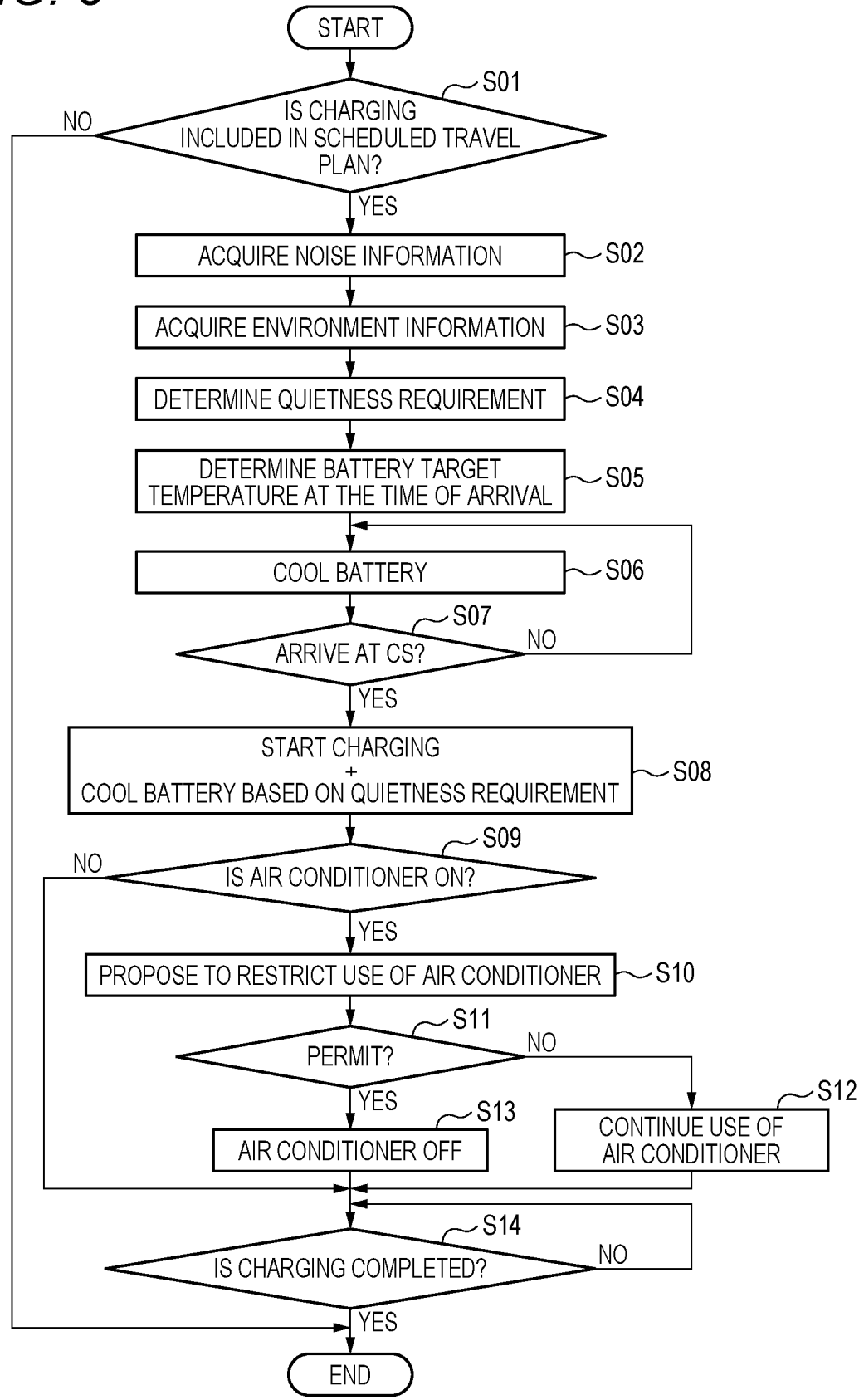
FIG. 8 is a flowchart illustrating a processing procedure of a controller 20.

As illustrated in FIG. 8, the controller 20 determines whether charging is included in the scheduled travel plan (S01), and ends the processing when a determination result is NO, and acquires the noise information related to the charging station CS that performs the charging and the environment information of the charging place where the charging is performed when the determination result is YES (S02 and S03). Next, the controller 20 determines a quietness requirement of the charging place based on the acquired noise information and environment information (S04), and determines a battery target temperature at the time of arrival at the charging place based on the quietness requirement (S05). Thereafter, the controller 20 determines the arrival at the charging station CS (S07) while cooling the battery BAT based on the battery target temperature (S06).

When it is determined that the vehicle has arrived at the charging station CS, the controller 20 causes the charging station CS to start charging of the battery BAT and causes the battery BAT to be cooled based on the quietness requirement (S08). The controller 20 determines whether the air conditioner 18 (appropriately referred to as an air conditioner in FIG. 8) is in use during the charging of the battery BAT (S09), and makes a proposal to the user of restricting the use of the air conditioner 18 when a determination result is YES (S10). Thereafter, the controller 20 determines whether the proposal is permitted (S11), and continues the use of the air conditioner 18 when a determination result is NO (S12), and stops the use of the air conditioner 18 and distributes the cooling capacity thereof to the battery cooling circuit 19 when the determination result is YES (S13). Then, the controller 20 cools the battery BAT until it is determined that the charging is completed (S14).

Although embodiments for carrying out the present disclosure have been described above using the embodiment, the present disclosure is by no means limited to these embodiments, and various modifications and substitutions can be made without departing from the gist of the present disclosure.

Further, at least the following matters are described in the present description. Although corresponding constituent elements and the like in the above embodiment are shown in parentheses, the present disclosure is not limited thereto.

(1) A charging control system (charging control system 10) including: a battery (battery BAT) rechargeable with electric power from an external power supply (external power supply 50);

a battery cooler (battery cooling circuit 19) that cools the battery; and a controller (controller 20) that controls charging of the battery and cooling of the battery, in which the controller includes a charging-related information acquisition unit (charging-related information acquisition unit 25) that acquires, in a case where charging is included in a scheduled travel plan, noise information related to a charging system (charging station CS) that performs the charging and environment information of a charging place where the charging is performed;

a quietness requirement determination unit (quietness requirement determination unit 26) that determines a quietness requirement of the charging place based on the noise information and the environment information:

a battery target temperature determination unit (battery target temperature determination unit 27) that determines a target temperature of the battery at the time of arrival at the charging place or at the time of start of the charging based on the quietness requirement; and a battery cooling control unit (cooling control unit 23) that controls the battery cooling device based on the target temperature of the battery.

According to (I), since the quietness requirement of the charging place is determined based on the noise information related to the charging system that performs the charging and the environment information of the charging place where the charging is performed, it is possible to perform charging in consideration of the neighborhood affected by the charging. In addition, since the target temperature of the battery at the time of arrival at the charging place or at the time of start of the charging is determined in accordance with the quietness requirement, it is possible to avoid an output of the battery from being restricted while preventing generation of noise. Therefore, it is possible to avoid an increase in the charging time and an increase in a time required to reach the destination.

(2) The charging control system according to (1), in which the battery target temperature determination unit sets the target temperature of the battery to be lower when the quietness requirement is high than when the quietness requirement is low.

According to (2), the battery temperature can be lowered in advance at the start of the charging in consideration of the cooling of the battery corresponding to the quietness requirement.

(3) The charging control system according to (1) or (2), in which the quietness requirement determination unit sets a higher one of a first quietness requirement based on the noise information and a second quietness requirement based on the environment information as the quietness requirement.

According to (3), it is possible to prevent an adverse effect on the neighborhood associated with the charging.

(4) The charging control system according to (3), in which the first quietness requirement is set to be lower when a noise of the noise information is large than when the noise is small.

According to (4), when the noise of the charging system is large, the operation sound associated with the cooling of the battery can be hidden.

(5) The charging control system according to (3) or (4), in which the second quietness requirement is set in accordance with classification of the charging place and a time during which the charging is performed.

According to (5), since the quietness requirement is changed in accordance with the charging place and the time zone in which the charging is performed, it is possible to balance the consideration for the neighborhood and the availability of the charging control system.

(6) The charging control system according to any one of (1) to (5), further including:

an air conditioner (air conditioner 18) that adjusts a temperature in a vehicle cabin; and a heat exchanger (chiller 189) that exchanges heat between a refrigerant of the battery cooler and a refrigerant of the air conditioner, in which the battery cooling control unit reduces an upper limit rotation speed of a compressor (compressor 181) of a refrigeration cycle (refrigeration cycle 180) of the air conditioner and reduces a duty ratio of an electric pump (pump EWP) of the battery cooler when the quietness requirement is high, as compared with a case where the quietness requirement is low.

According to (6), the cooling performance can be improved without increasing sizes of the air conditioner and the battery cooler. In addition, when the quietness requirement is high, the upper limit rotation speed of the compressor of the refrigeration cycle of the air conditioner is reduced, and the duty ratio of the electric pump of the battery cooler is reduced, so that the operation sound of the temperature control device can be reduced.

(7) The charging control system according to (6), in which the battery cooling control unit proposes permission to restrict use of the air conditioner during the charging, and lowers cooling capacity of the air conditioner when the proposal is approved.

According to (7), since the use of the air conditioner is restricted during the charging, the battery can be more appropriately cooled by distributing the cooling capacity of the air conditioner to the battery cooler. Since the use of the air conditioner is restricted when the proposal is approved, it is possible to prevent deterioration in convenience of the occupant staying in the vehicle during the charging.

What is claimed is:

1. A charging control system comprising:
    a battery rechargeable with electric power from an external power supply;
    a battery cooler that cools the battery; and
    a controller that controls charging of the battery and cooling of the battery, wherein the controller includes processing circuitry configured to:
        acquire, in a case where charging is included in a scheduled travel plan, noise information related to a charging system that performs the charging and environment information of a charging place where the charging is performed before arrival at the charging place;
        determine a quietness requirement of the charging place based on the noise information and the environment information;
        determine a target temperature of the battery at a time of arrival at the charging place based on the quietness requirement; and
    control the battery cooler based on the scheduled travel plan such that a temperature of the battery reaches the target temperature of the battery at the time of arrival at the charging place.

2. The charging control system according to claim 1, wherein
    the processing circuitry is configured to set the target temperature of the battery to be lower when the quietness requirement is high than when the quietness requirement is low.

3. The charging control system according to claim 1, wherein
    the processing circuitry is configured to set a higher one of a first quietness requirement based on the noise information and a second quietness requirement based on the environment information as the quietness requirement.

4. The charging control system according to claim 3, wherein
    the first quietness requirement is set to be lower when a noise of the noise information is large than when the noise is small.

5. The charging control system according to claim 3, wherein
the second quietness requirement is set in accordance with classification of the charging place and a time during which the charging is performed.

6. The charging control system according to claim 1, further comprising:
an air conditioner that adjusts a temperature in a vehicle cabin; and
a heat exchanger that exchanges heat between a refrigerant of the battery cooler and a refrigerant of the air conditioner, wherein
the processing circuitry is configured to reduce an upper limit rotation speed of a compressor of a refrigeration cycle of the air conditioner and reduce a duty ratio of an electric pump of the battery cooler when the quietness requirement is high, as compared with a case where the quietness requirement is low.

7. The charging control system according to claim 6, wherein
the processing circuitry is configured to propose permission to restrict use of the air conditioner during the charging, and lower cooling capacity of the air conditioner when the proposal is approved.

* * * * *